United States Patent
Kato et al.

(10) Patent No.: US 6,790,160 B2
(45) Date of Patent: Sep. 14, 2004

(54) CONTROL DEVICE AND CONTROL METHOD FOR A VEHICULAR AUTOMATIC TRANSMISSION

(75) Inventors: Shinji Kato, Auderghem (BE);
Toshimitsu Sato, Toyota (JP);
Kazuyuki Watanabe, Anjou (JP);
Naoyuki Sakamoto, Toyota (JP);
Atsushi Ayabe, Toyota (JP); Hiromichi Kimura, Okazaki (JP); Yasuo Hojo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/303,891

(22) Filed: Nov. 26, 2002

(65) Prior Publication Data

US 2003/0100403 A1 May 29, 2003

(30) Foreign Application Priority Data

Nov. 29, 2001 (JP) ........................................ 2001-364447

(51) Int. Cl.[7] .............................................. F16H 61/04
(52) U.S. Cl. ......................................... 477/154; 701/59
(58) Field of Search ................................ 477/116, 117, 477/154, 155; 701/59

(56) References Cited

U.S. PATENT DOCUMENTS

| 5,976,057 A | * | 11/1999 | Mori ........................... 477/150 |
| 6,077,191 A | * | 6/2000 | Minowa et al. .............. 477/109 |
| 6,334,833 B1 | * | 1/2002 | Ochi et al. .................... 477/143 |

FOREIGN PATENT DOCUMENTS

| JP | 1-229147 A | 9/1989 |
| JP | 7-19326 A | 1/1995 |
| JP | 7-27215 A | 1/1995 |
| JP | 10-184880 A | 7/1998 |

OTHER PUBLICATIONS

U.S. Publication No.: 2002/0198647, Dec. 2002, Ser. No.: 10/127,707, T. Kawamoto, et al.

\* cited by examiner

*Primary Examiner*—Richard M. Lorence
(74) *Attorney, Agent, or Firm*—Oblon, Spivak, McClelland, Maier & Neustadt, P.C.

(57) ABSTRACT

When a clutch is disengaged in a D-N shift, a duty ratio of a linear solenoid in a stand-by state at a constant pressure is calculated according to the following equation by using the following values: a reference duty ratio in a stand-by state at a constant pressure; a correction value for an AT oil temperature; a correction value for an engine speed; and respective learning correction values in a N-D shift and a 4-3 coast down shift in which the clutch is engaged. In the equation, K is a coefficient and has a constant value predetermined in the range of $0 \leq K \leq 1$.

$$DSL3_A = dsdn + dsdntmp + dsdnne + K \times gdndlrn + (1-K)gdcstapl$$

14 Claims, 10 Drawing Sheets

FIG. 2

| POSITION | | CLUTCHES AND BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| 1st ENGINE BRAKE | | ○ | × | × | × | ○ | × | ○ | △ | △ |

ND CONTROL
CONTROL DEVICE AND CONTROL METHOD FOR A VEHICULAR AUTOMATIC TRANSMISSION

INCORPORATION BY REFERENCE

The disclosure of Japanese Patent Application No. 2001-364447 filed on Nov. 29, 2001 including the specification, drawings and abstract is incorporated herein by reference in its entirety.

BACKGROUND OF THE INVENTION

1. Field of the Invention

The invention generally relates to a control apparatus for a vehicular automatic transmission. More particularly, the invention relates to controlling the engaging force of a frictional engaging device when a gear is shifted from a driving gear to a non-driving gear.

2. Description of Related Art

A vehicular automatic transmission device having the following two elements has been known: (a) an automatic transmission attaining a plurality of gears having different power transmission states by selectively engaging and disengaging a plurality of frictional engaging devices, and having a driving gear for allowing power transmission and a non-driving gear for disconnecting power transmission; and (b) engaging-force control means for controlling engaging force of the frictional engaging devices when selectively engaging and disengaging the frictional engagement devices. One example of such an automatic transmission device is described in Japanese Patent Laid-Open Publication No. 1-229147. This automatic transmission device includes as the engaging-force control means a linear solenoid valve for controlling a hydraulic pressure of a hydraulic frictional engaging device. In this automatic transmission device, when a gear is shifted from a driving gear to a non-driving gear by disengaging the hydraulic frictional engaging device (clutch) (i.e., gearshift from "drive (D)" to "neutral (N)"), the hydraulic pressure of the hydraulic frictional engaging device is controlled using a value such as that of a throttle valve opening as a parameter. In other words, the engaging force is controlled so as to disengage the clutch. A gearshift between a driving gear to a non-drive gear is commonly performed while the vehicle is stopped. In this state, however, power is transmitted from a driving power source (such as an engine) to the automatic transmission through a hydraulic transmission (such as a torque converter). In the driving gear in the state where the vehicle is stopped, the input revolution speed of the automatic transmission is zero, but driving torque is output to the wheel side. Therefore, if power transmission is disconnected as a result of gearshift from the driving gear to the non-driving gear, the driving torque is abruptly released, whereby shift shock may possibly occur.

Therefore, even if the engaging force is controlled as described in Japanese Patent Laid-Open Publication No. 1-229147, the engaging force is not necessarily controlled in a desired manner due to the individual differences of the frictional engaging devices and their control system, aging thereof, and the like. As a result, shift shock may possibly occur. Learning correction is effective for the individual differences and aging. For example, it is possible to conduct learning correction of the engaging force based on a change in input rotational speed to the automatic transmission caused by a gearshift from a driving gear to a non-driving gear, that is, based on an increase in input rotational speed to a value close to the rotational speed of the driving power source caused by disconnection of power transmission. However, the time required for a gearshift from the driving gear to the non-driving gear is generally very short, such as one second or less, and normally about 0.5 seconds or less. Moreover, the input rotational speed is zero before the gearshift. It is therefore difficult to detect a change in input rotational speed with high accuracy. As a result, learning correction cannot be performed in a sufficiently satisfactory manner. It is generally difficult for a currently used rotational speed sensor to detect a rotational speed of about several hundreds of rpm or less with high accuracy.

SUMMARY OF THE INVENTION

It is an object of the invention to minimize shift shock generated by a gearshift when making a transition from a driving gear to a non-driving gear, i.e., a gearshift whose learning correction is difficult, in an excellent manner regardless of the individual differences of frictional engaging devices, their control system, aging thereof, and the like.

A first aspect of the invention relates to a control apparatus for a vehicular automatic transmission that attains a plurality of gears having different power transmission states by selectively engaging and disengaging at least one of a plurality of frictional engaging devices including first and second frictional engaging devices, and includes an engaging-force control device that controls, when selectively engaging and disengaging the frictional engaging devices, engaging force of the selectively engaged and disengaged frictional engaging devices. This control apparatus includes a controller that performs learning correction of the engaging force of the first frictional engaging device based on a predetermined control parameter when performing a prescribed first gearshift between the gears, and corrects the engaging force of the second frictional engaging device based on the learning correction performed by the controller when performing a second gearshift different from the first gearshift. In the first gearshift, the first frictional engaging device is selectively engaged and disengaged and the engaging force of the first frictional engaging device is controlled by the engaging-force control device. In the second gearshift, the second frictional engaging device is selectively engaged and disengaged and the engaging force of the second frictional engaging device is controlled by the engaging-force control device.

In the first aspect of the invention, the engaging force of the second frictional engaging device, which is controlled by the engaging-force control device in the second gearshift, is corrected using the learning correction which was performed based on the predetermined control parameter by the controller in the first gearshift different from the second gearshift. By using the learning correction of the first gearshift in order to control the engaging force in the second gearshift, learning correction of the second gearshift can be eliminated, whereby the overall control of the engaging force can be simplified.

A second aspect of the invention relates to a control method for a vehicular automatic transmission that attains a plurality of gears having different power transmission states by selectively engaging and disengaging at least one of a plurality of frictional engaging devices including first and second frictional engaging devices, and includes an engaging-force control device that controls, when selectively engaging and disengaging the frictional engaging devices, engaging force of the selectively engaged and disengaged frictional engaging devices. The control method of the second aspect includes the steps of performing learning correction of the engaging force of the first frictional engaging device based on a predetermined control parameter when performing a prescribed first gearshift between the gears. In the first gearshift, the first frictional engaging device is selectively engaged and disengaged and the engaging force of the first frictional engaging device is controlled by the engaging-force control device. The controller corrects the engaging force of the second frictional engaging device based on the learning correction performed in the first gearshift when performing a second gearshift different from the first gearshift. In the second gearshift, the second frictional engaging device being selectively engaged and disengaged and the engaging force of the second frictional engaging device is controlled by the engaging-force control device.

In the invention, the second frictional engaging device may be substantially identical to the first frictional engaging device, i.e., the second frictional engaging device may serve as the first frictional engaging device.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 illustrates engaged and disengaged states of clutches and brakes for attaining each gear of an automatic transmission in FIG. 1;

DETAILED DESCRIPTION OF THE PREFERRED EMBODIMENTS

Hereinafter, embodiments of the invention will be described in detail with reference to the accompanying drawings.

Figure 1:
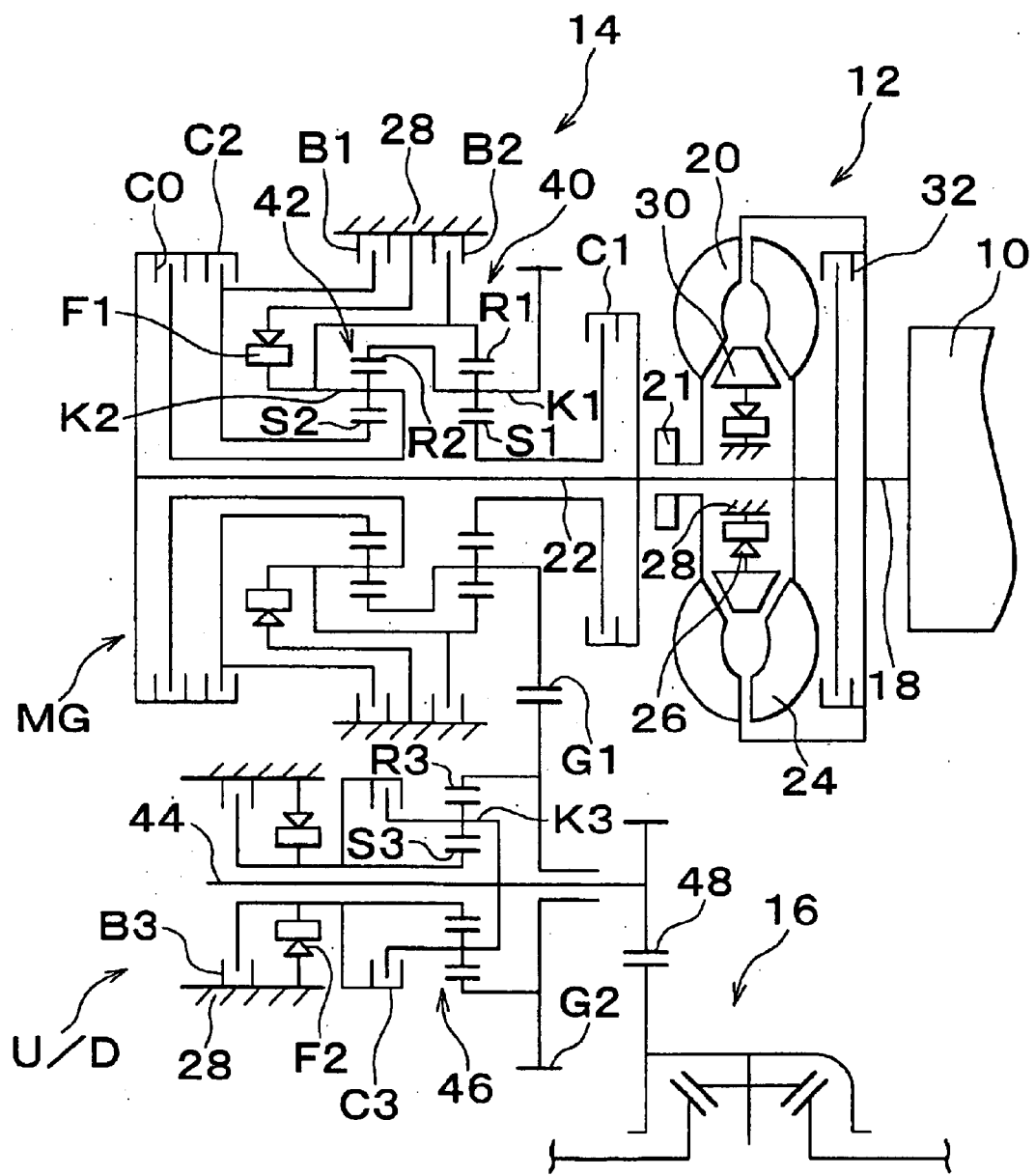
FIG. 1 schematically shows the structure of a vehicle drive device to which the invention is applied.

FIG. 1 schematically shows a transversely mounted drive device for a vehicle such as a FF (front engine front drive) vehicle. The output of an engine 10 such as a gasoline engine is transmitted to driving wheels (front wheels), not shown, through a torque converter 12, an automatic transmission 14, and a differential gear unit 16. The torque converter 12 includes a pump wheel 20 connected to a crankshaft 18 of the engine 10, a turbine wheel 24 connected to an input shaft 22 of the automatic transmission 14, a stator 30 fixed to a housing 28, which is a non-rotary member, through a one-way clutch 26, and a lock-up clutch 32 connected to the input shaft 22 through a damper, not shown. A mechanical oil pump 21 such as a gear pump is connected to the pump wheel 20. This oil pump 21 is rotated together with the pump wheel 20 by the engine 10 and generates a hydraulic pressure for shifting gears, lubrication and the like. The engine 10 is a driving power source for running, and the torque converter 12 is a hydraulic transmission.

The automatic transmission 14 includes a first planetary gear drive 40, a second planetary gear drive 42, a third planetary gear drive 46, and an output gear 48. The first planetary gear drive 40 and the second planetary gear drive 42 are coaxially provided on the input shaft 22. A carrier of the first planetary gear drive 40 is connected to a ring gear of the second planetary gear drive 42, and a carrier of the second planetary gear driver 42 is connected to a ring gear of the first planetary gear drive 40. In other words, the first and second planetary gear drives 40, 42 are single-pinion planetary gear devices forming a so-called planetary gear mechanism having CR—CR connection. The third planetary gear drive 46 is coaxially provided on a counter shaft 44 extending in parallel with the input shaft 22. The output gear 48 is fixed to the end of the counter shaft 44 and meshes with the differential gear unit 16.

Components of the planetary gear drives 40, 42, 46 (i.e., a sun gear, a ring gear, and carriers for rotatably supporting a planetary gear which meshes with the sun gear and the ring gear) are selectively connected to each other by four clutches C0, C1, C2, C3, or are selectively connected to the housing 28 (non-rotary member) by three brakes B1, B2, B3. The components are engaged either with each other or with the housing 28 by two one-way clutches F1, F2 depending on their rotation direction. Note that since the differential gear unit 16 is symmetrical with respect to the axis (drive shaft), the lower part of the differential gear unit 16 is not shown in the figure.

The first planetary gear drive 40, the second planetary gear drive 42, the clutches C0, C1, C2, the brakes B1, B2, and the one-way clutch F1 are coaxially provided on the input shaft 22 and form a main shift section MG having four forward gears and a single reverse gear. A set of the planetary gear drive 46, the clutch C3, the brake B3 and the one-way clutch F2 is provided on the counter shaft 44, and forms a sub shift section, that is, an under-drive section U/D. In the main shift section MG, the input shaft 22 is connected to the carrier K2 of the second planetary gear drive 42, the sun gear SI of the first planetary gear drive 40 and the sun gear S2 of the second planetary gear drive 42 through the clutches C0, C1, C2, respectively. The ring gear R1 of the first planetary gear drive 40 is connected to the carrier K2 of the second planetary gear drive 42, and the ring gear R2 of the second planetary gear drive 42 is connected to the carrier K1 of the first planetary gear drive 40. The sun gear S2 of the second planetary gear drive 42 is connected to the housing 28, which is a non-rotary member, through the brake B1, and the ring gear R1 of the first planetary gear drive 40 is connected to the housing 28 through the brake B2. The one-way clutch F1 is provided between the carrier K2 of the second planetary gear drive 42 and the housing 28. A first counter gear G1 fixed to the carrier K1 of the first planetary gear drive 40 meshes with a second counter gear G2 fixed to the ring gear R3 of the third planetary gear drive 46. In the under-drive section U/D, the carrier K3 and the sun gear S3 of the third planetary gear drive 46 are connected to each other through the clutch C3. The brake B3 and the one-way clutch F2 are provided in parallel between the sun gear S3 and the housing 28.

The clutches C0, C1, C2, C3 and the brakes B1, B2, B3 (hereinafter, simply referred to as clutches C and brakes B unless individual clutches and brakes need to be identified) are hydraulic frictional engaging devices (such as multiple-disc clutches or band brakes) which are engaged and disengaged by a hydraulic actuator. For example, the clutches C and the brakes B are engaged and disengaged as shown in FIG. 2 by exciting and de-exciting linear solenoids SL1, SL2, SL3, SLT and solenoids DSL, S4, SR of a hydraulic control circuit 98 (see FIG. 3) or by switching an oil path of the hydraulic control circuit 98 by a manual valve 100 (see FIG. 7). As a result, five forward gears, a single reverse gear, and a neutral gear are attained according to the position of a shift lever 72 (see FIG. 3). The manual valve 100 is mechanically connected to the shift lever 72, and the oil path of the hydraulic control circuit 98 is mechanically switched according to the position of the manual valve 100. In FIG. 2, "1st" to "5th" indicate the first to fifth forward gears, "○" indicates "engaged", "x" indicates "disengaged", and "Δ" indicates "engaged in the only driving state". For example, the shift lever 72 is shifted to a parking position "P", a reverse position "R", a neutral position "N", and forward running positions "D", "4", "3", "2", "L" according to the shift pattern of FIG. 4. In the "P" and "N" positions, a neutral gear is attained as a non-driving gear for disconnecting power transmission. In the "P" position, a mechanical parking brake, not shown, mechanically prevents rotation of the driving wheels. The five forward gears and the reverse gear attained in the forward running positions such as "D" and the "R" position correspond to the driving gears.

For example, in FIG. 2, a shift between the first and second gears (i.e., a shift from the first gear to the second gear or a shift from the second gear to the first gear) is obtained by selectively engaging and disengaging the brake B1. However, a shift between the fourth and fifth gears (i.e., a shift from the fourth gear to the fifth gear or a shift from the fifth gear to the fourth gear) is a so-called clutch-to-clutch shift which is obtained by disengaging the brake B3 and engaging the clutch C3 or by disengaging the clutch C3 and engaging the brake B3. A shift between the second and third gears (i.e., a shift from the second gear to the third gear or a shift from the third gear to the second gear) is also a clutch-to-clutch shift which is obtained by disengaging the brake B1 and engaging the clutch C0 or by disengaging the clutch C0 and engaging the brake B1. A shift between the third and fourth gears (i.e., a shift from the third gear to the fourth gear or a shift from the fourth gear to the third gear) is also a clutch-to-clutch shift which is obtained by disengaging the clutch C1 and engaging the brake B1 or by disengaging the brake B1 and engaging the clutch C1. A down-shift to the first gear for engine brake is a clutch-to-clutch shift.

Figure 3:
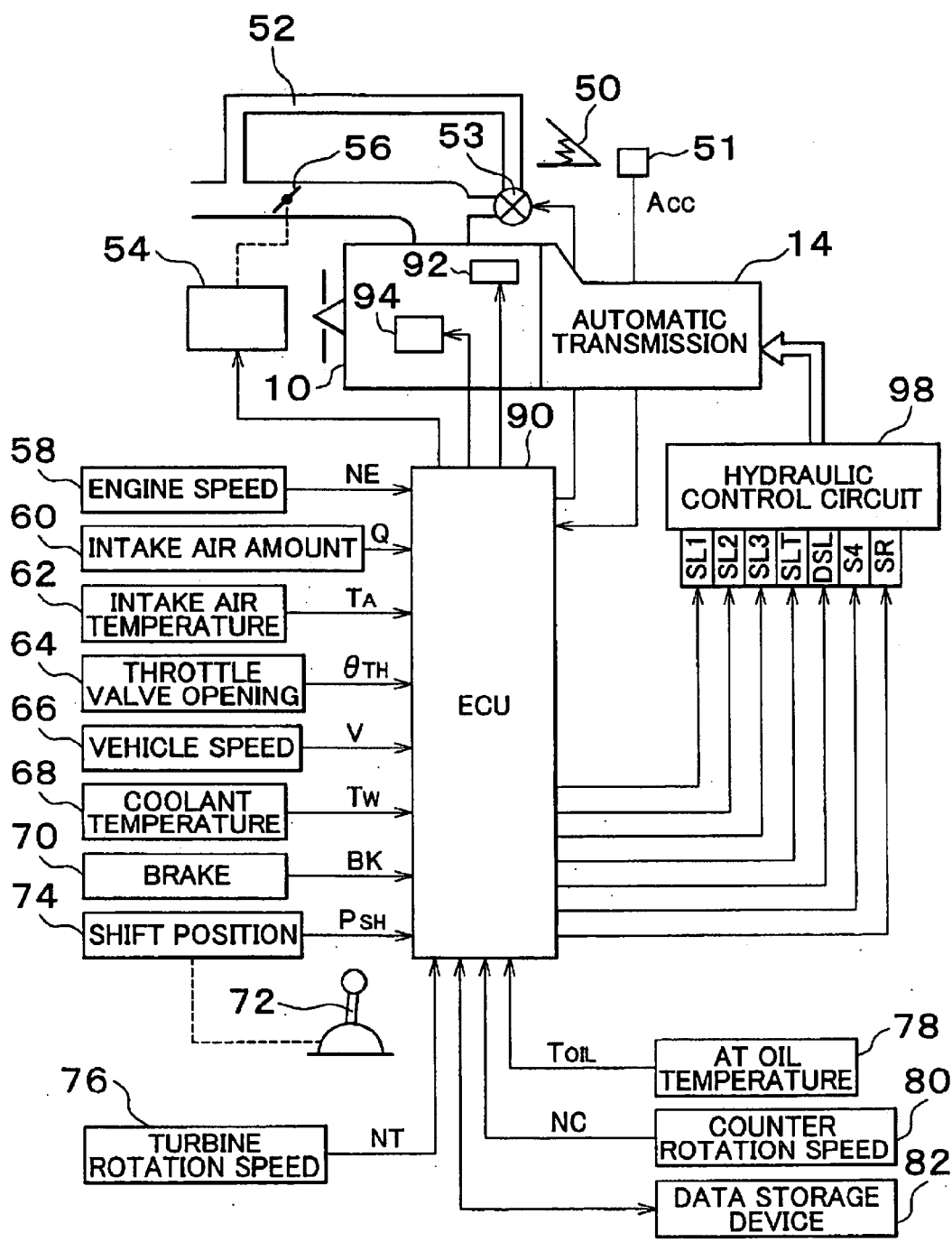
FIG. 3 is a block diagram showing a control system for conducting engine control and shift control of the vehicle drive device in FIG. 1.
Figure 4:
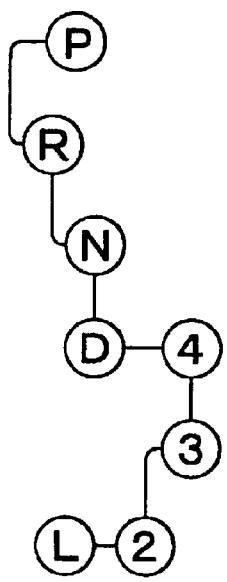
FIG. 4 shows an example of a shift pattern of a shift lever in FIG. 3.

FIG. 3 is a block diagram illustrating a control system which is provided in a vehicle in order to control elements such as the engine 10 and the automatic transmission 14 of FIG. 1. An accelerator operation amount sensor 51 detects the operation amount Acc of an accelerator pedal 50. The accelerator pedal 50 is operated according to the output amount required by a driver. The accelerator pedal 50 can be regarded as an accelerator operating member, and the operation amount Acc of the accelerator pedal 50 can be regarded as the required output amount. An electronic throttle valve 56 is provided in an intake pipe of the engine 10. A throttle actuator 54 opens the electronic throttle valve 56 at an angle (opening) $\theta_{TH}$ according to the operation amount Acc of the accelerator pedal 50. A bypass passage 52 bypasses the electronic throttle valve 56 in order to control the idling speed. An ISC (Idling Speed Control) valve 53 for controlling the amount of intake air introduced when the electronic throttle valve 56 is in a fully closed state is provided in the bypass passage 52 in order to control an idling speed $NE_{IDL}$ of the engine 10. The control system further includes the following elements: an engine speed sensor 58 for detecting an engine speed NE of the engine 10; an intake air amount sensor 60 for detecting an intake air amount Q of the engine 10; an intake air temperature sensor 62 for detecting a temperature $T_A$ of the intake air; a throttle sensor 64 with an idle switch for detecting the fully closed state (idle state) and an opening $\theta_{TH}$ of the electronic throttle valve 56; a vehicle speed sensor 66 for detecting a rotational speed $N_{OUT}$ of the counter shaft 44 which corresponds to a vehicle speed V; a coolant temperature sensor 68 for detecting a temperature $T_W$ of the coolant of the engine 10; a brake switch 70 for detecting operation of the brake; a shift position sensor 74 for detecting a shift position (operation position) $P_{SH}$ of the shift lever 72; a turbine rotational speed sensor 76 for detecting a turbine rotational speed NT (=a rotational speed $N_{IN}$ of the input shaft 22); an AT (Automatic Transmission) oil temperature sensor 78 for detecting an AT oil temperature $T_{OIL}$, i.e., a temperature of a hydraulic fluid within the hydraulic control circuit 98; a counter rotational speed sensor 80 for detecting a rotational speed NC of a first counter gear G1; and the like. These sensors supply the following signals to an ECU (Electronic Control Unit) 90: signals indicating the engine speed NE, the intake air amount Q, the intake air temperature $T_A$, the throttle valve opening $\theta_{TH}$, the vehicle speed V, the engine coolant temperature $T_W$, the operation state BK of the brake, the shift position $P_{SH}$ of the shift lever 72, the turbine rotational speed NT, the AT oil temperature $T_{OIL}$, the counter rotational speed NC, and the like.

Figure 5:
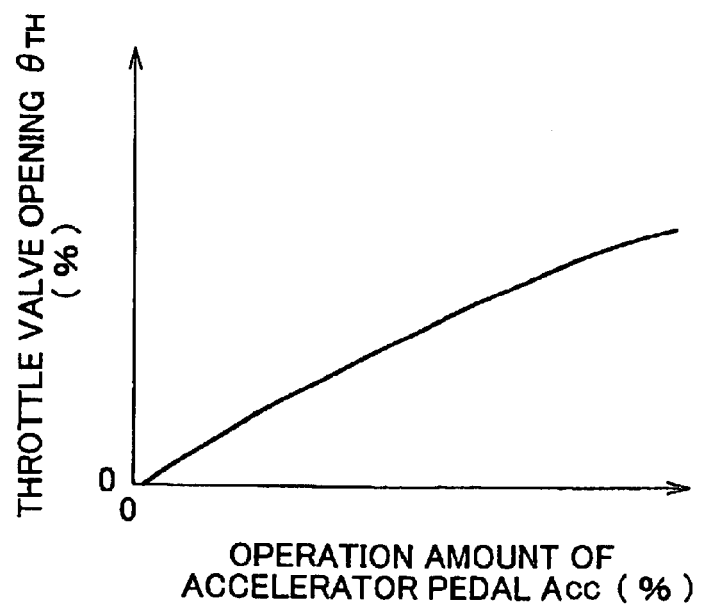
FIG. 5 shows an example of the relation between the operation amount Acc of an accelerator pedal and a throttle valve opening $\theta_{TH}$, which is used in throttle control performed by an ECU (Electronic Control Unit) in FIG. 3.

The ECU 90 includes a so-called microcomputer having a CPU (Central Processing Unit), a RAM (Random Access Memory), a ROM (Read Only Memory), an input/output interface and the like. The CPU conducts output control of the engine 10 and shift control of the automatic transmission 14 by performing signal processing according to a program pre-stored in the ROM and using a temporary storage function of the RAM. The CPU is divided into a section for engine control and a section for shift control, if necessary. In the output control of the engine 10, the electronic throttle valve 56 is opened and closed by the throttle actuator 54, a fuel injection valve 92 is controlled in order to control the fuel injection amount, an ignition device 94 such as an igniter is controlled in order to control the ignition timing, and the ISC valve 53 is controlled in order to control the idling speed. For example, the electronic throttle valve 56 is controlled by driving the throttle actuator 54 based on the actual operation amount Ace of the accelerator pedal 50 from the relationship shown in FIG. 5. More specifically, the throttle valve opening $\theta_{TH}$ is increased as the operation amount Ace of the accelerator pedal 50 is increased.

Figure 6:
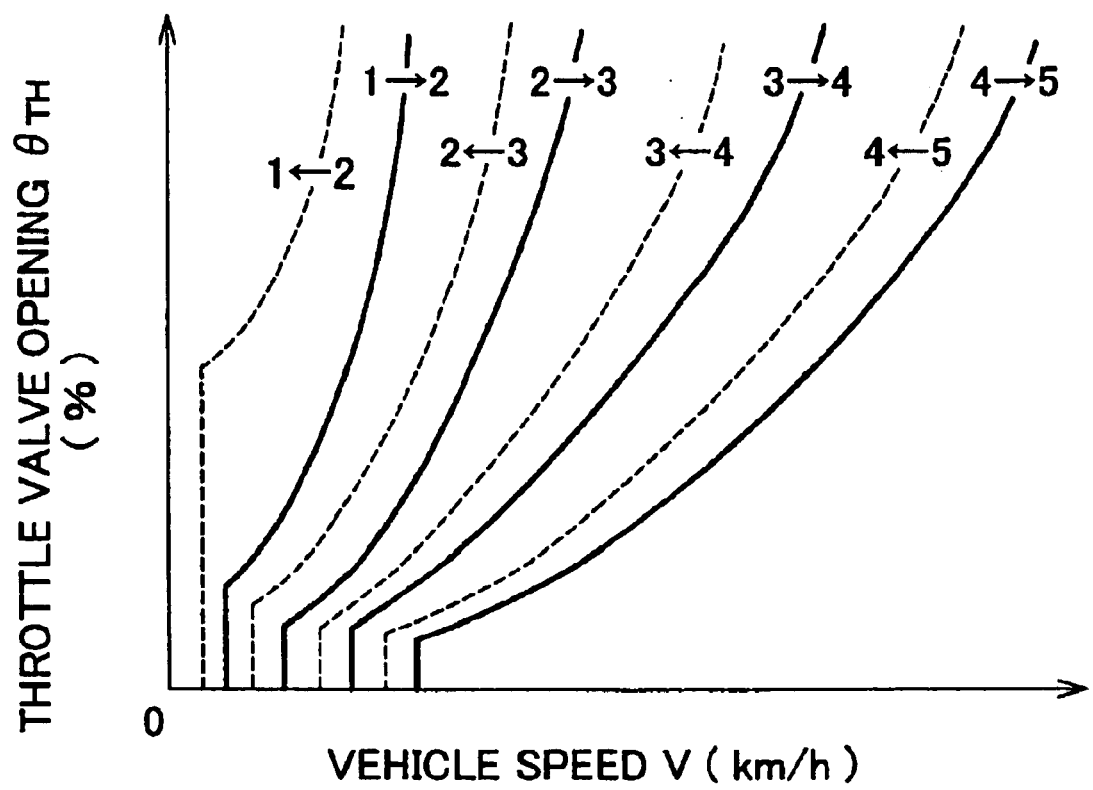
FIG. 6 shows an example of a shift map used in shift control of the automatic transmission performed by the ECU in FIG. 3.

For example, shift control of the automatic transmission 14 is performed as follows: according to a pre-stored shift map (shift conditions) shown in FIG. 6, the gear of the automatic transmission 14 is determined based on the actual throttle valve opening $\theta_{TH}$ and the actual vehicle speed V. Then, the solenoids DSL, S4, SR of the hydraulic control circuit 98 are turned ON (excited) or OFF (de-excited) or the excitation state of the linear solenoids SL1, SL2, SL3, SLT is continuously varied by duty control or the like in order to attain the determined gear. The linear solenoids SL1, SL2, SL3 can directly control the hydraulic pressures for engaging the brake B1 and the clutches C0, C1, respectively. The linear solenoids SL1, SL2, SL3 thus adjust these hydraulic pressures so as to minimize shift shock such as a change in driving force and to minimize degradation in durability of a friction member. In FIG. 6, the solid lines are up-shift lines and the dashed lines are down-shift lines. As the vehicle speed V is reduced or the throttle valve opening $\theta_{TH}$ is increased, the gear is shifted to a lower gear having a greater gear ratio (=input rotational speed $N_{IN}$/output rotational speed $N_{OUT}$). Note that "1" to "5" in FIG. 6 indicates the first gear "1st" to the fifth gear "5th".

Figure 7:
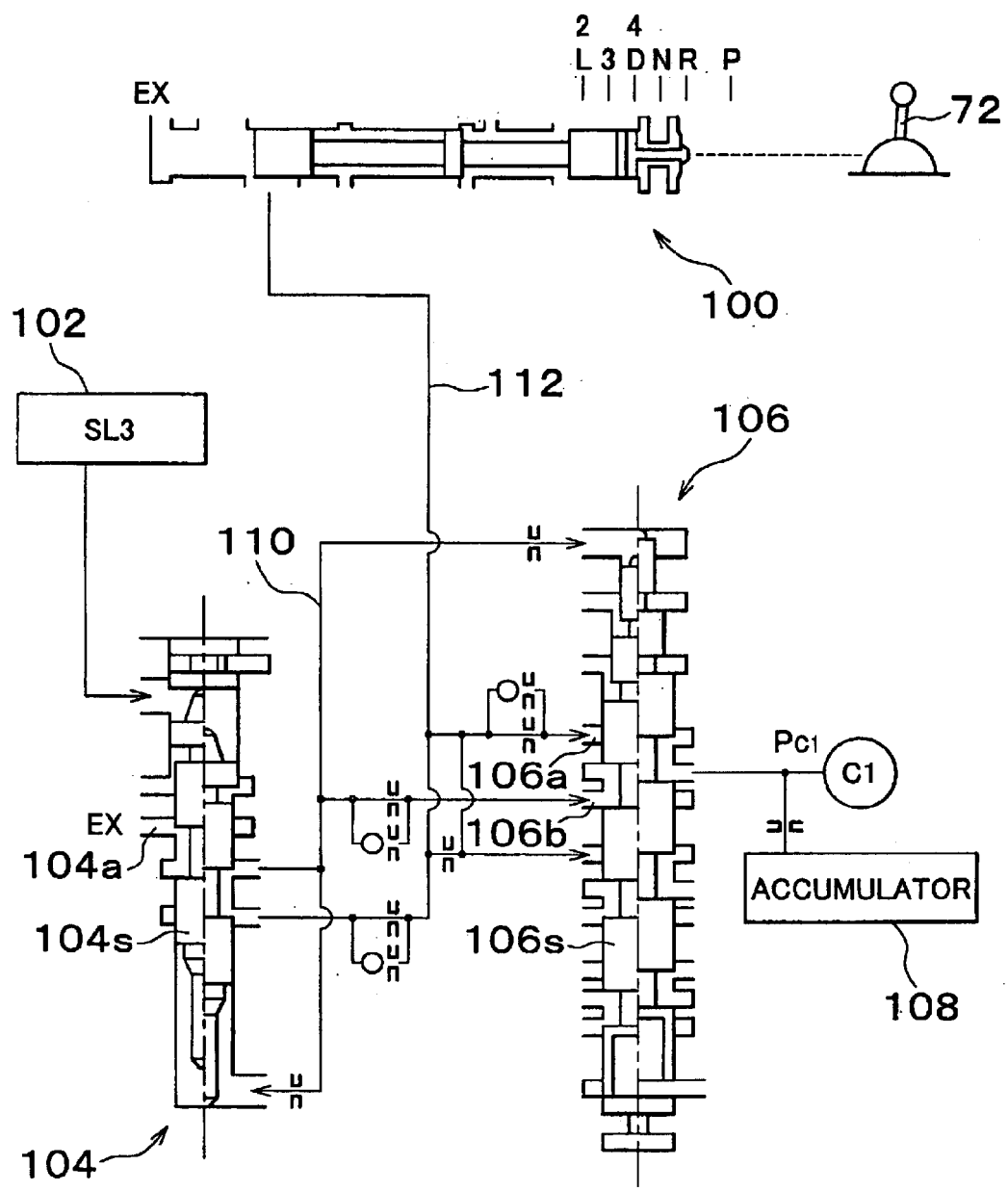
FIG. 7 shows a portion of a hydraulic control circuit in FIG. 3 which is associated with engaging and disengaging of a clutch C1.

FIG. 7 specifically shows a portion of the hydraulic control circuit which is associated with engaging and disengaging of the clutch C1. In addition to the manual valve 100, the hydraulic control circuit includes a linear solenoid valve 102 which is continuously opened and closed by the linear solenoid SL3, a C1 control valve 104, a clutch apply control valve 106, and an accumulator 108. In the "N" position, a spool 106s of the clutch apply control valve 106 is held at the upper end position shown to the right of the center line, and a hydraulic fluid within a hydraulic actuator of the clutch C1 is discharged from a port 106a into an oil path 112 and drained from the manual valve 100. As a result, the clutch C1 is disengaged. Note that the linear solenoid valve 102 is normally open. In other words, the linear solenoid valve 102 is open when the duty ratio of an exciting current is zero. The linear solenoid valve 102 outputs a hydraulic pressure to the C1 control valve 104 to hold a spool 104s at the lower end position shown to the right of the center line. In this state, an oil path 110 communicates with the oil path 112.

On the other hand, when the shift lever 72 is shifted from the "D" position to the "N" position in order to shift the gear from the first gear to the neutral gear (hereinafter, sometimes referred to as "D-N shift"), the ECU 90 temporarily excites the solenoid S4 (see FIG. 3). As a result, the spool 106s of the clutch apply control valve 106 is held at the lower end position shown to the left of the center line, and the hydraulic actuator of the clutch C1 communicates with the oil path 110 through a port 106b. An exciting current is supplied to the linear solenoid SL3 at a prescribed duty ratio DSL3, and the output hydraulic pressure of the linear solenoid valve 102 is reduced according to the duty ratio DSL3. The spool 104s of the C1 control valve 104 is thus moved as shown to the left side of the center line. As a result, the hydraulic fluid within the hydraulic actuator of the clutch C1 is discharged from the port 106b of the clutch apply control valve 106 into the oil path. 110, and is drained through a port 104a of the C1 control valve 104 at a prescribed flow rate. A hydraulic pressure $P_{C1}$ of the clutch C1 is thus quickly reduced and the clutch C1 is disengaged while suppressing shift shock. Even when the clutch C1 is engaged, that is, when the shift lever 72 is shifted from the "N" position to the "D" position in order to shift the gear from the neutral gear to the first gear (hereinafter, sometimes referred to as "N-D shift"), and when the gear is shifted from the fourth gear to the third gear (hereinafter, sometimes referred to as "4-3 coast down shift"), the linear solenoid SL3 is duty-controlled, and the flow rate of the hydraulic fluid to be supplied from the manual valve 100 to the clutch C1 via the oil path 112 and the port 106a by the C1 control valve 104, that is, the hydraulic pressure $P_{C1}$ of the clutch C1 during transition to an engaged state, is controlled.

Figure 8:
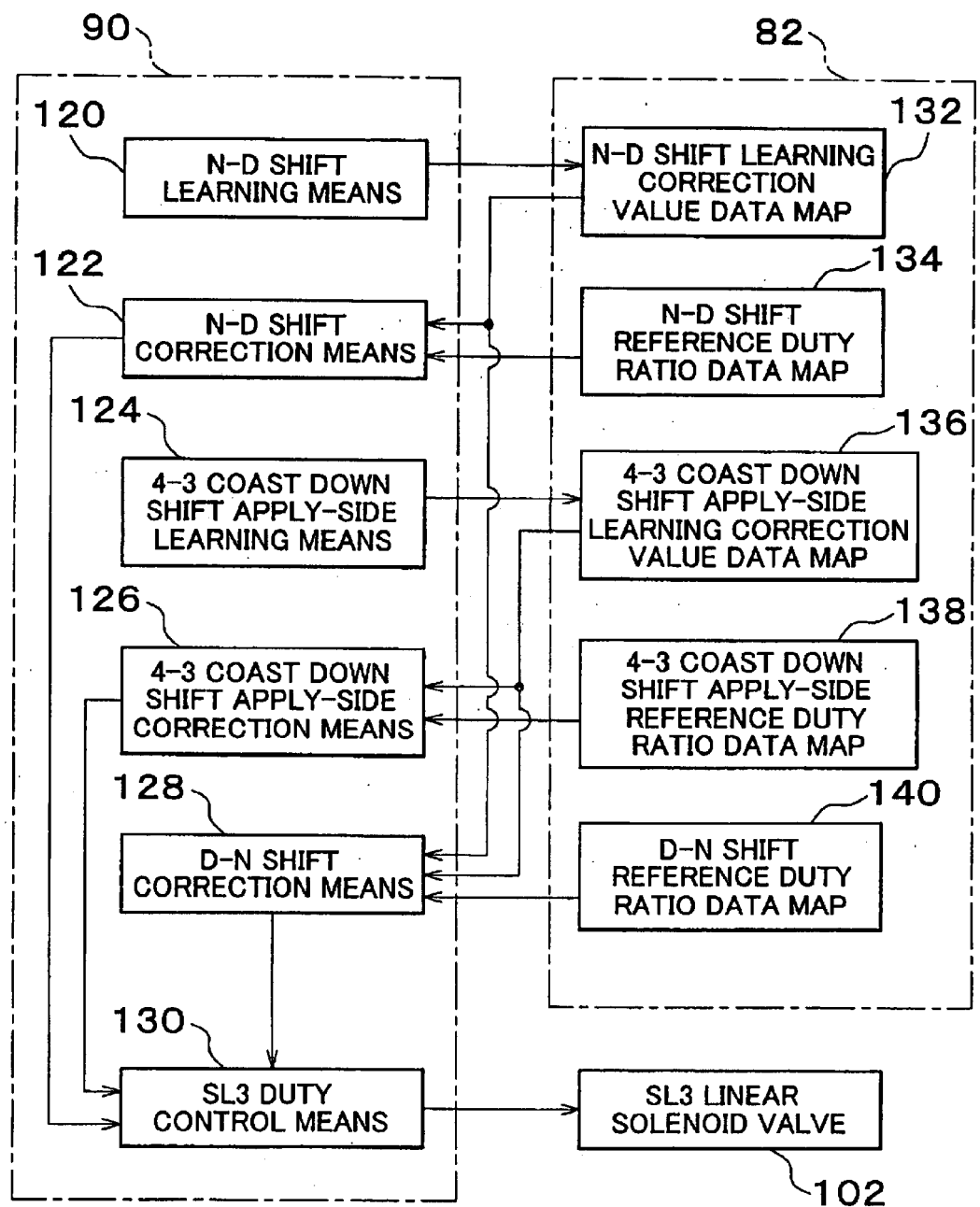
FIG. 8 is a block diagram illustrating functions associated with engaging and disengaging of the clutch C1 in N-D shift, 4-3 coast down shift, and D-N shift performed by the ECU in FIG. 3.

As shown in FIG. 8, the ECU 90 has the following functions regarding hydraulic control for engaging and disengaging the clutch C1 by the linear solenoid SL3, that is, control of engaging force: N-D shift learning means 120; N-D shift correction means 122; apply-side learning means 124; apply-side correction means 126; D-N shift correction means 128; and SL3 duty control means 130. The N-D shift learning means 120, the N-D shift correction means 122, the apply-side learning means 124 and the apply-side correction means 126 can be regarded as a controller according to the invention. The D-N shift correction means 128 can be regarded as a controller according to the invention. The SL3 duty control means 130 can be regarded as an element forming engaging-force control device and element forming engaging-force control means together with the linear solenoid valve 102. The clutch C1 can be regarded as a first frictional engage device and a second frictional engage device. N-D shift can be regarded as gearshift from a non-driving gear to a driving gear according to the invention, and 4-3 coast down shift can be regarded as gearshift between a plurality of driving gears according to the invention. The N-D shift and 4-3 coast down shift can be regarded as first gearshift according to the invention. D-N shift can be regarded as gearshift from a driving gear to a non-driving gear according to the invention and second gearshift according to the invention.

When the clutch C1 is engaged for N-D shift, the duty ratio DSL3 of the linear solenoid SL3 is swept at a prescribed gradient in order to gradually increase the hydraulic pressure $P_{C1}$ of the clutch C1. The N-D shift correction means 122 corrects an initial duty ratio to be swept to gradually increase the hydraulic pressure $P_{C1}$ of the clutch C1. More specifically, the N-D shift correction means 122 corrects the initial duty ratio by adding a learning correction value gdndlrn stored in a data map 132 to an initial reference duty ratio pre-stored in a data map 134. The data map 132 is a data map of a learning correction value in the N-D shift (hereinafter, referred to as "N-D shift learning correction value data map 132"), and the data map 134 is a data map of a reference duty ratio in the N-D shift (hereinafter, referred to as "N-D shift reference duty ratio data map 134"). The N-D shift correction means 122 outputs the corrected initial value and a designated value of the duty ratio for the sweeping operation to the SL3 duty control means 130. The SL3 duty control means 130 duty-controls the linear solenoid SL3 according to the designated value received from the N-D shift correction means 122. As a result, the hydraulic pressure $P_{C1}$ is gradually increased and the clutch C1 is engaged, whereby the first gear is attained. The reference duty ratio and the learning correction value gdndlrn are stored using operation states such as AT oil temperature $T_{OIL}$ and turbine rotational speed NT as parameters. The N-D shift reference duty ratio data map 134 and the N-D shift learning correction value data map 132 are stored in a data storage device 82 (see FIG. 3).

The N-D shift learning means 120 updates the learning correction value gdndlrn to an optimal value as appropriate. As the clutch C1 is engaged in the N-D shift, the turbine rotational speed NT which is approximately the same as the engine speed NE varies to the value corresponding to the vehicle speed V. Normally, the turbine rotational speed NT varies so that NT=0 when the vehicle speed V=0. For example, the N-D shift learning means 120 updates the learning correction value gdndlrn as appropriate according to the difference between an actual change rate of the turbine rotational speed NT and a predetermined target change rate so that the change rate of the turbine rotational speed NT becomes equal to the target change rate. As a result, the N-D shift is appropriately performed while suppressing shift shock such as torque fluctuation, regardless of variations of various components, aging of the components, and the like. The turbine rotational speed NT is an input rotational speed to the automatic transmission 14. The data storage device 82 has elements such as an SRAM (Static Random Access Memory) which is rewritable as appropriate and is capable of holding storage data even after the power is OFF.

The 4-3 coast down shift is performed in response to a reduction in vehicle speed V when the accelerator pedal 50 is not being depressed. More specifically, the gear is downshifted from the fourth gear to the third gear according to the shift map in FIG. 6. According to the 4-3 coast down shift, the brake B1 is disengaged and the clutch C1 is engaged. In the hydraulic control of the apply side, i.e., in the hydraulic control for engaging the clutch C1 by supplying the hydraulic oil, the apply-side correction means 126 corrects the initial duty ratio DSL3 of the linear solenoid SL3 which is to be swept at a prescribed gradient to gradually increase the hydraulic pressure $P_{C1}$ of the clutch C1. More specifically, the apply-side correction means 126 corrects the initial duty ratio DSL3 by adding a learning correction value gdcstapl stored in a data map 136 to the initial reference duty ratio pre-stored in a data map 138. The data map 136 is a data map of a learning correction value of the apply side in the 4-3 coast down shift (hereinafter, referred to as "4-3 coast down shift apply-side learning correction value data map 136"), and the data map 138 is a data map of a reference duty ratio of the apply side in the 4-3 coast down shift (hereinafter, referred to as "4-3 coast down shift apply-side reference duty ratio data map 138"). Moreover, the apply-side correction means 126 outputs the corrected initial value and a designated value of the duty ratio for the sweeping operation to the SL3 duty control means 130. The SL3 duty control means 130 duty-controls the linear solenoid SL3 according to the designated value. The hydraulic pressure $P_{C1}$ is thus gradually increased and the clutch C1 is engaged. Moreover, the brake B1 is disengaged. As a result, the gear is downshifted from the fourth gear to the third gear. The reference duty ratio and the learning correction value gdcstapl are stored using the operation states such as AT oil pressure $T_{OIL}$ as parameters. The 4-3 coast down shift apply-side reference duty ratio data map 138 and the 4-3 coast down shift apply-side learning correction value data map 136 are stored in the data storage device 82.

The apply-side correction means 126 updates the learning correction value gdcstapl to an optimal value as appropriate. In the 4-3 coast down shift, the turbine rotational speed NT is increased according to a change in gear ratio. However, in the clutch-to-clutch shift in which the clutch C1 is engaged and the brake B1 is disengaged, lock up of the transmission and an abrupt rise in an engine speed may occur. In this case, the turbine rotational speed NT increases abnormally or changes at a rate beyond a prescribed range. Accordingly, the 4-3 coast down shift apply-side correction means 126 updates the learning correction value gdndlrn as appropriate. For example, if lock up of the transmission or an abrupt rise in an engine speed is detected based on a change in turbine rotational speed NT, the 4-3 coast down shift apply-side correction means 126 gradually updates the learning correction value gdndlrn by increasing or decreasing the learning correction value gdcstapl by a predetermined amount or by changing the learning correction value gdcstapl according to the excessive turbine rotational speed NT. As a result, the 4-3 coast down shift is appropriately performed while suppressing shift shock such as torque fluctuation, regardless of variation of various components, aging of the components, and the like.

The D-N shift correction means 128 corrects a duty ratio $DSL3_A$ (see FIG. 12) of the linear solenoid SL3. The duty ratio $DSL3_A$ is a duty ratio in a stand-by state at a constant pressure when the clutch C1 is disengaged in the D-N shift. The D-N shift correction means 128 corrects a reference duty ratio dsdn (i.e., a reference duty ratio in a stand-by state at a constant pressure) according to the following equation (1) by using the following values: a correction value dsdntmp for the AT oil temperature $T_{OIL}$; a correction value dsdnne for the engine speed NE; a learning correction value gdndlrn in the N-D shift; and a learning correction value gdcstapl in the 4-3 coast down shift. The reference duty ratio dsdn is pre-stored in a data map 140 using operation states such as vehicle speed V as parameters. The data map 140 is a data map of a reference duty ratio in the D-N shift (hereinafter, referred to as "D-N shift reference duty ratio data map 140"). In the equation (1), K is a coefficient and has a constant value in the range of $0 \leq K \leq 1$ that is predetermined in a test or the like.

$$DSL3_A = dsdn + dsdntmp + dsdnne + K \times gdndlrn + (1-K)gdcstapl \quad (1)$$

Figure 9:
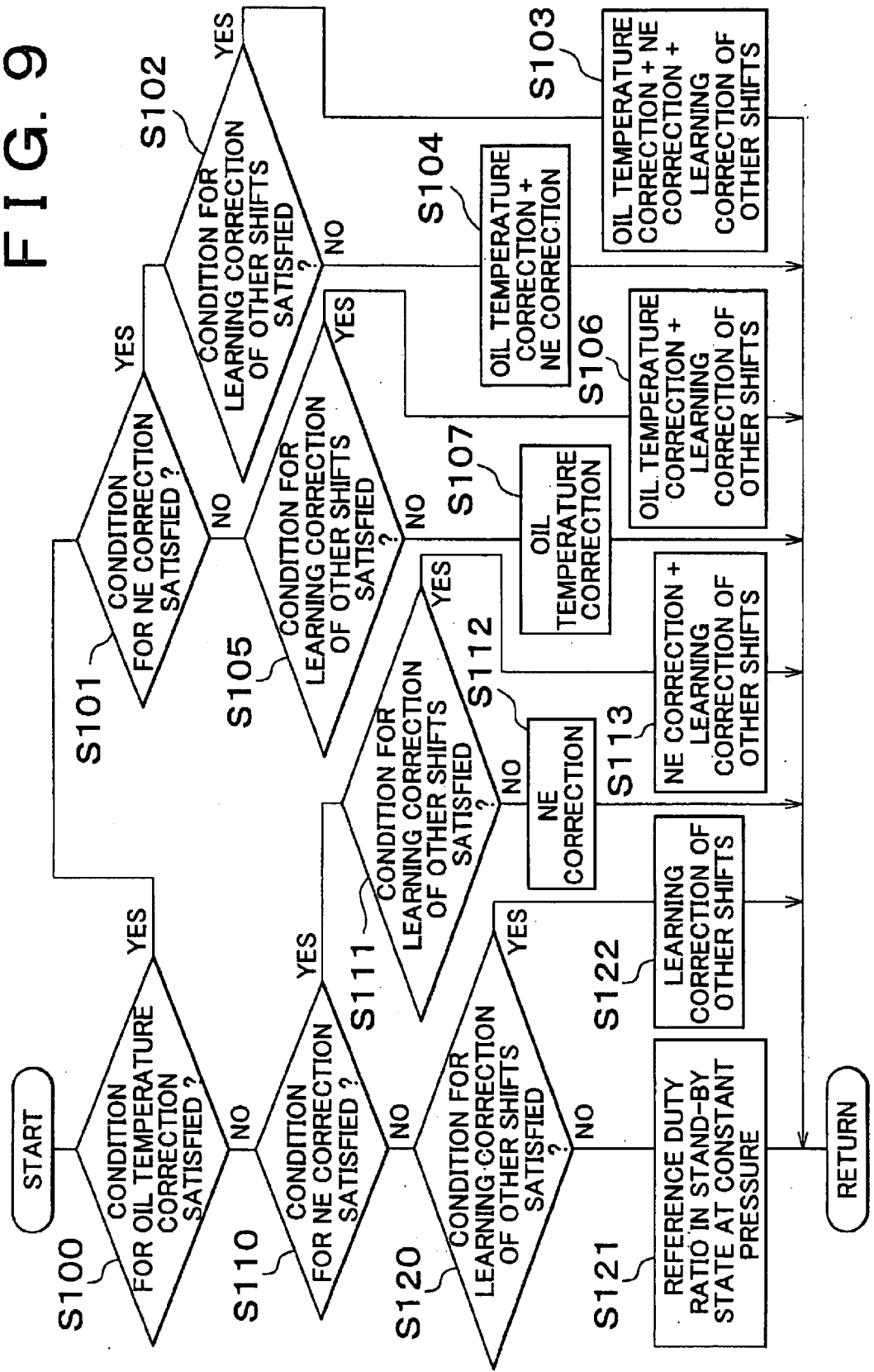
FIG. 9 is a flowchart specifically illustrating signal processing performed by D-N shift correction means in FIG. 8.

FIG. 9 is a flowchart specifically illustrating procedures for calculating the duty ratio $DSL3_A$ according to the equation (1). Oil temperature correction is a correction of the duty ratio $DSL3_A$ based on the AT oil temperature $T_{OIL}$. NE correction is a correction of the duty ratio $DSL3_A$ based on the engine speed NE. In the present embodiment, learning correction of other shifts is a correction of the duty ratio $DSL3_A$ based on learning correction in the N-D shift and the 4-3 coast down shift. In FIG. 9, whether each correction is satisfied or not (YES or NO) means whether the correction value is non-zero or not. Note that the D-N shift reference duty ratio data map 140 is stored in the data storage device 82.

Figure 10:
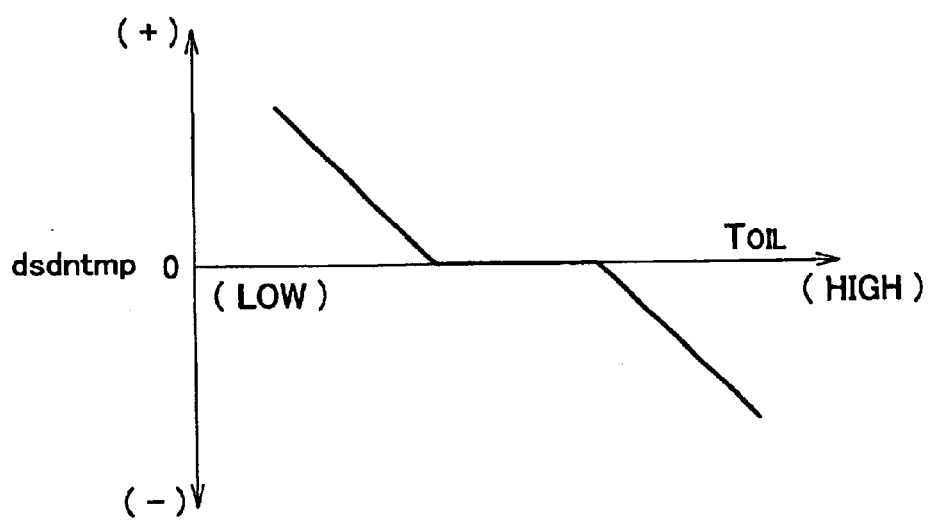
FIG. 10 shows an example of a data map of a correction value used to correct a duty ratio $DSL3_A$ according to an AT oil temperature $T_{OIL}$ by the D-N shift correction means in FIG. 8.
Figure 11:
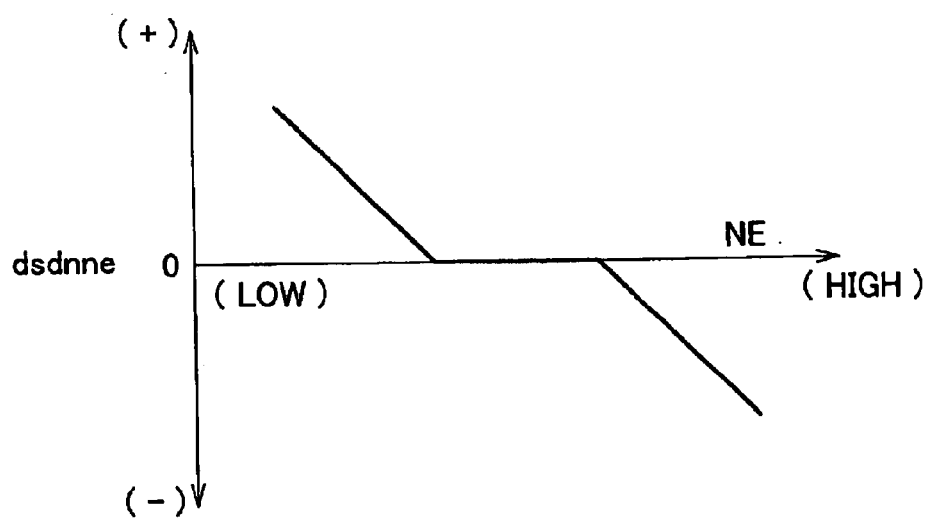
FIG. 11 shows an example of a data map of a correction value used to correct the duty ratio $DSL3_A$ according to an engine speed NE by the D-N shift correction means in FIG. 8.

The correction value dsdntmp for the AT oil temperature TOIL is pre-stored in the data storage device 82. The correction value dsdntmp is determined in view of the flow resistance caused by the difference in viscosity of the hydraulic fluid due to a temperature change. For example, the hydraulic fluid has low viscosity at a high temperature and high viscosity at a low temperature. Therefore, as shown in FIG. 10, the duty ratio $DSL3_A$ is reduced at a high temperature so that the hydraulic fluid is less likely to be discharged. On the other hand, the duty ratio $DSL3_A$ is increased at a low temperature so that the hydraulic fluid is more likely to be discharged. The correction value dsdnne for the engine speed NE is pre-stored in the data storage device 82. The correction value dsdnne is determined in view of a line oil pressure PL that varies according to the rotational speed of the oil pump 21 rotated by the engine 10. For example, the line oil pressure PL is increased when the oil pump 21 rotates at a high speed, and is reduced when the oil pump 21 rotates at a low speed. Therefore, as shown in FIG. 11, the duty ratio $DSL3_A$ is reduced at a high rotational speed so that the hydraulic fluid is less likely to be discharged. On the other hand, the duty ratio $DSL3_A$ is increased at a low rotational speed so that the hydraulic fluid is more likely to be discharged. In this case, the engine speed NE is normally an idling speed $NE_{IDL}$ in the state where the accelerator pedal 50 is not being depressed.

First, whether a condition for oil temperature correction is satisfied or not is determined in step S100. In other words, whether the correction value dsdntmp is zero or not is determined. If the correction value dsdntmp is zero, the routine proceeds to step S110. If the correction value dsdntmp is not zero, the routine proceeds to step S101. In step S101, whether a condition for NE correction is satisfied or not is determined. In other words, whether the correction value dsdnne is zero or not is determined. If the correction value dsdnne is zero, the routine proceeds to step S102. If the correction value dsdnne is not zero, the routine proceeds to step S105. In step S102, whether a condition for learning correction of other shifts is satisfied or not is determined. If the learning correction values gdndlrn and gdcstapl are both zero, the routine proceeds to step S104. In step S104, dsdn+dsdntmp+dsdnne is obtained as $DSL3_A$, and the routine is then completed. On the other hand, if the learning correction values gdndlrn and gdcstapl are not zero, the routine proceeds to step S103. In step S103, dsdn+dsdntmp+dsdnne+K×gdndlrn+(1−K) gdcstapl is obtained as $DSL3_A$, and the routine is then completed. If NO in step S101, whether a condition for learning correction of other shifts (which is the same as step S102) is satisfied or not is determined in step S105. If NO in step S105, the routine proceeds to step S107. In step S107, dsdn+dsdntmp is obtained as $DSL3_A$ and the routine is then completed. If YES in step S105, the routine proceeds to step S106. In step S106, dsdn+dsdntmp+K×gdndlrn+(1−K) gdcstapl is obtained as $DSL3_A$, and the routine is then completed.

If NO in step S100, whether a condition for NE correction (which is the same as step S101) is satisfied or not is determined instep S110. If NO instep S110, the routine proceeds to step S120. If YES in step S110, the routine proceeds to step S111. In step S111, whether a condition for learning correction of other shifts (which is the same as step S102) is satisfied or not is determined. If NO in step S111, the routine proceeds to step S112. In step S112, dsdn+dsdnne is obtained as $DSL3_A$, and the routine is then completed. If YES in step Sill, the routine proceeds to step S113. In step S113, dsdn+dsdnne+K×gdndlrn+(1−K) gdcstapl is obtained as $DSL^3A$, and the routine is then completed.

If NO in step S110, whether a condition for learning correction of other shifts (which is the same as step S102) is satisfied or not is determined in step S120. If NO in step S120, the routine proceeds to step S121. In step S121, dsdn is obtained as $DSL3_A$, and the routine is then completed. If YES in step S120, the routine proceeds to step S122. In step S122, dsdn+K×gdndlrn+(1−K) gdcstapl is obtained as $DSL3_A$, and the routine is then completed.

Figure 12:
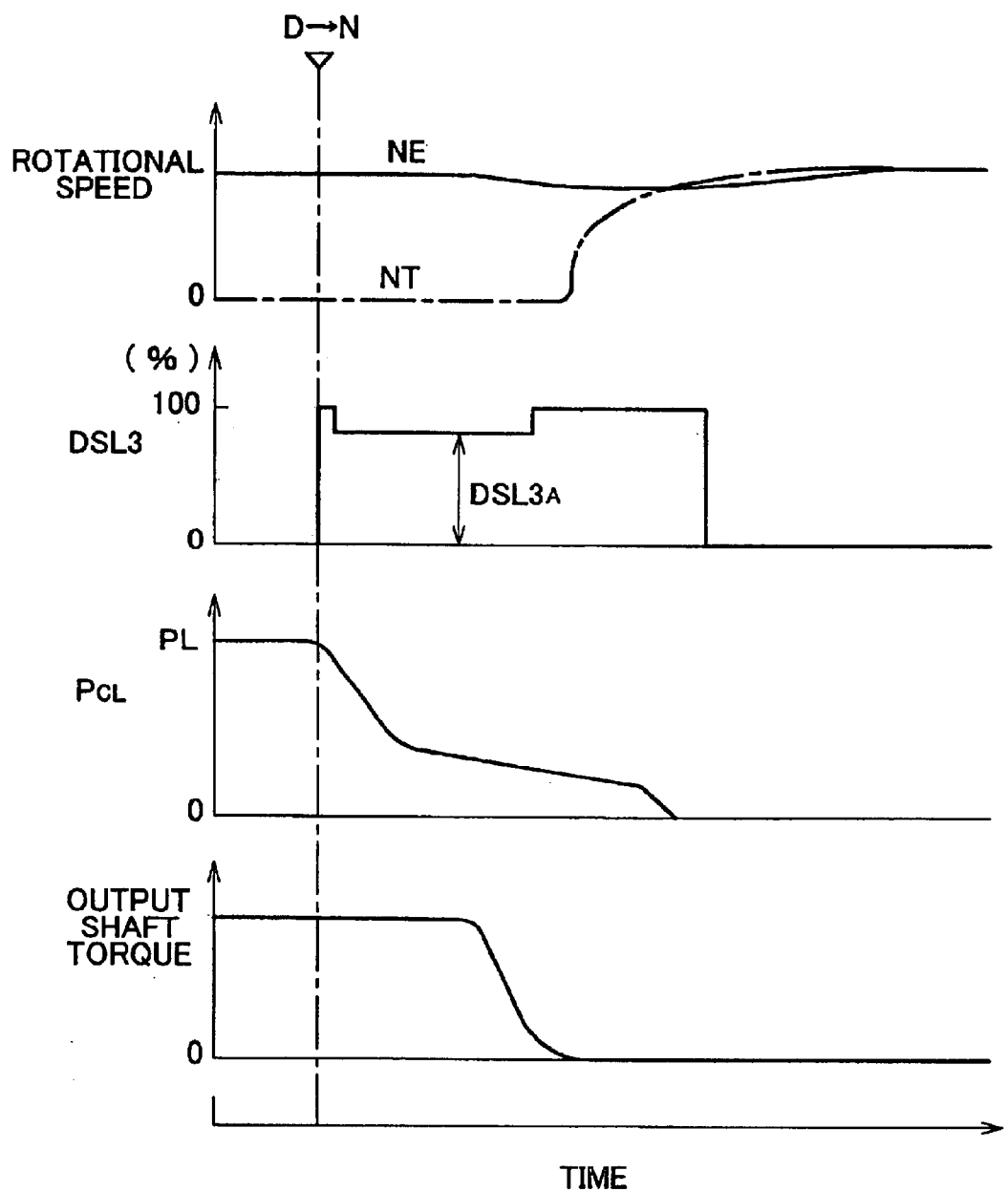
FIG. 12 shows an example of a timing chart showing a change of each portion in the D-N shift.

Then, a designated value of the corrected duty ratio $DSL3_A$ obtained according to the equation (1) is output to the SL3 duty control means 130. The linear solenoid SL3 is then duty-controlled according to the designated value. As a result, the oil pressure $P_{C1}$ is gradually reduced and the clutch C1 is disengaged, whereby the neutral gear is attained. FIG. 12 shows an example of a timing chart showing a change of each portion in the D-N shift performed while the vehicle is stopped.

When the D-N shift is performed while the vehicle is stopped, the turbine rotational speed NT increases from zero to a value near the engine speed NE due to operation of the torque converter 12. However, the time require for the D-N shift is generally very short, such as about 0.5 seconds or less. Moreover, the turbine rotational speed NT is zero before the D-N shift, and is equal to about several hundreds of rpm after the D-N shift. Moreover, it is difficult for the turbine rotational speed sensor 76 to detect a rotational speed of about several hundreds of rpm or less with high accuracy. It is therefore difficult to conduct learning correction in order to disengage the clutch C1 based on the change in turbine rotational speed NT. In the present embodiment, however, the duty ratio $DSL^3A$ in a stand-by state at a constant pressure is corrected using the learning correction value gdndlrn for the D-N shift and the learning correction value gdcstapl for the 4-3 coast down shift. Therefore, desired hydraulic control is performed regardless of the individual differences of the components such as clutch C1, linear solenoid valve 102 and C1 control valve 104, aging of the components, and the like. As a result, shift shock caused by releasing the output shaft torque (disconnecting power transmission) is reduced.

Learning correction in the N-D shift and apply-side learning correction in the 4-3 coast down shift are both associated with engagement control of the clutch C1. The D-N shift is achieved by disengaging the clutch C1. Therefore, by using these learning correction values gdndlrn and gdcstapl for engagement control of the clutch C1 in the D-N shift, the clutch C1 is disengaged in the D-N shift in a particularly satisfactory manner regardless of the individual differences of the components such as clutch C1, linear solenoid valve 102 and C1 control valve 104, aging of the components, and the like.

Learning correction in the N-D shift is performed based on a change in turbine rotational speed NT from approximately the same value as the engine speed NE to zero. However, since the original rotational speed is not zero, the change in rotational speed NT can be detected with high accuracy, whereby learning correction can be performed in a sufficiently satisfactory manner. Therefore, in the D-N shift, the duty ratio $DSL3_A$ in a stand-by state at a constant pressure is corrected using the learning correction value gdndlrn, whereby defective control (shift shock) can be prevented from being caused by the individual differences of the components such as clutch C1, linear solenoid valve 102 and C1 control valve 104, aging of the components, and the like.

In the 4-3 coast down shift, the turbine rotational speed NT is approximately the same as the engine speed NE. Moreover, the time required for the 4-3 coast down shift is relatively long and the turbine rotational speed NT varies relatively slowly. Therefore, in the 4-3 coast down shift, the change in turbine rotational speed NT can be detected with high accuracy, whereby learning correction can be performed in a sufficiently satisfactory manner based on the change in turbine rotational speed NT. Accordingly, in the D-N shift, the duty ratio $DSL3_A$ in a stand-by state at a constant pressure is corrected using the learning correction value gdcstapl, whereby defective control (shift shock) caused by the individual differences of the components such as clutch C1, linear solenoid valve 102 and C1 control valve 104, aging of the components, and the like, can be minimized.

In the present embodiment, the duty ratio $DSL3_A$ in a stand-by state at a constant pressure is corrected based on the AT oil temperature $T_{OIL}$ in addition to the above learning correction. Therefore, the clutch is disengaged in a desired manner regardless of a change in viscosity of the hydraulic fluid caused by the difference in AT oil temperature $T_{OIL}$. As a result, shift shock in the D-N shift can be more effectively reduced.

In the present embodiment, the duty ratio $DSL3_A$ in a stand-by state at a constant pressure is corrected based on the engine speed NE of the engine 10 for rotating the oil pump 21. Therefore, the clutch is disengaged in a desired manner regardless of a change in line oil pressure PL caused by the difference in engine speed NE. As a result, shift shock in the D-N shift can be more effectively reduced.

Although the embodiment of the invention has been described in detail with reference to the figures, it should be understood that the embodiment is by way of illustration and example only, and various modifications and improvements can be made based on the knowledge of those skilled in the art. For example, the following modifications are possible.

In the above embodiment, the hydraulic frictional engage device engaged by the hydraulic actuator is used as a frictional engage device, and engaging force of the frictional engaging device is hydraulically controlled by duty control of the linear solenoid valve, or the like. However, a frictional engaging device for generating engaging force by a means other than hydraulic pressure, such as electromagnetic force, may alternatively be used.

In the above embodiment, a torque converter is used as a hydraulic transmission. However, a hydraulic transmission may be used which allows the input rotational speed to an automatic transmission to become zero when the vehicle is stopped while maintaining the operation state of a driving power source such as an internal combustion engine, with a fluid coupling or the like.

The hydraulic transmission is not essential. Instead of the hydraulic transmission, a starting clutch for connecting and disconnecting power transmission may be provided, or rotation of the driving power source may be stopped when the vehicle is stopped. In the above embodiment, an engine is used as a driving power source. The engine may be an internal combustion engine such as a gasoline engine and a diesel engine. Another driving power source such as an electric motor may be used instead of the internal combustion engine.

The automatic transmission of the invention need only include at least a driving gear and a non-driving gear. For example, the automatic transmission shifts a gear to a driving gear and a non-driving gear by merely engaging or disengaging a single frictional engaging device (the first and second frictional engaging devices are substantially the same). However, the automatic transmission may alternatively shift a gear to a driving gear and a non-driving gear by selectively engaging and disengaging a plurality of frictional engaging devices. The automatic transmission normally has a plurality of frictional engaging devices for a gearshift between a plurality of driving gears and a gearshift between a driving gear and a non-driving gear. As in the first embodiment, however, it is desirable that the first and second frictional engaging devices are substantially the same. As in the first embodiment, the second gearshift in which engaging force is controlled by using learning correction of the first gearshift may either be a gearshift between driving gears or a gearshift from a non-driving gear to a driving gear.

In the above embodiment, the gearshift between a plurality of driving gears of the automatic transmission is automatically performed according to shift conditions (such as a shift map) using values such as the output amount required by a driver (such as the operation amount of the accelerator pedal, and the throttle valve opening) and the vehicle speed as parameters. More specifically, when the required output amount is increased or the vehicle speed is reduced, a gear is downshifted to a driving gear having a larger gear ratio. However, the gearshift between a plurality of driving gears may alternatively be performed according to driver's gearshift operation (including upshift and downshift operations) using a shift lever or the like. In the case where the gearshift is automatically performed according to the shift conditions, correction of the engaging force for the gearshift from a driving gear to a non-driving gear may be performed using learning correction of the coast down shift. In this case, learning correction in the downshift and upshift operations performed while the power is ON (i.e., the accelerator pedal is being depressed) may be used. In addition to learning correction of the case where the gearshift between a plurality of driving gears is automatically performed according to the shift conditions, learning correction of the case where a gearshift between a plurality of driving gears is performed according to the driver's gearshift operation can be used.

In the above embodiment, learning correction is performed using a value such as a change in input rotational speed as a control parameter. However, this learning correction may alternatively be performed using a rotational speed other than the input rotational speed and a physical quantity other than the rotational speeds (such as engaging torque and driving torque) as control parameters. This learning correction (i.e., learning correction based on a change in input rotational speed) can be performed in various manners by using a parameter substantially corresponding to a change in input rotational speed (such as a time required for a prescribed variation or a prescribed variation region, a variation amount within a prescribed time, a change rate, an abnormal increase amount caused by an abrupt rise in an engine speed). For example, this learning correction may be performed by calculating a learning correction value or a change amount thereof according to a deviation from a predetermined target value, or the like. Alternatively, this learning correction may be performed by increasing or decreasing a learning correction value only by a prescribed amount when any trouble such as lock up of the transmission and an abrupt rise in an engine speed is detected.

In the above embodiment, hydraulic pressure is generated by a mechanical oil pump which is rotated by a driving power source for running. However, hydraulic pressure may alternatively be generated by an electric oil pump or the like.

In the above embodiment, the non-driving gear is a neutral gear. However, the non-driving gear may alternatively be a parking gear for applying a mechanical parking brake. In the above embodiment, the driving gear is a "D" range, a forward gear. However, the driving gear may be a reverse gear.

In the above embodiment, when the driving gear is a forward gear, a gearshift from the non-driving gear to the driving gear and a gearshift from the driving gear to the non-driving gear is normally a gearshift between the first gear having the largest gear ratio and the non-driving gear. However, in an automatic transmission capable of starting a vehicle from a forward gear having a smaller gear ratio than the first gear as in a snow mode, a gearshift from the non-driving gear to the driving gear and a gearshift from the driving gear to the non-driving gear may be a gearshift between this forward gear and the non-driving gear.

A gearshift from the non-driving gear to the driving gear and a gearshift from the driving gear to the non-driving gear are commonly performed according to operation of the shift lever. The operation position of the shift lever is determined as appropriate. For example, the non-drive gear is attained in a non-driving position such as N (neutral) and P (parking). The driving gear is attained in a forward running position such as D (drive) and a reverse running position such as R (reverse).

Learning correction performed for a gearshift from a non-driving gear to a driving gear and learning correction performed for a gearshift between driving gears may be performed either independently or simultaneously. In other words, engaging force for a gearshift from a driving gear to a non-driving gear is corrected by selecting one of the above two learning correction values depending on a condition, by using an average value of the above two learning correction values, by adding the above two learning correction values at a prescribed rate, or the like.

What is claimed is:

1. A control apparatus for a vehicular automatic transmission that attains a plurality of gears having different power transmission states by selectively engaging and disengaging at least one of a plurality of frictional engaging devices, comprising:

an engaging-force control device that controls, when selectively engaging and disengaging the at least one of the plurality of frictional engaging devices, an engaging force of the selectively engaged and disengaged frictional engaging devices, and a controller that performs learning correction of the engaging force of the at least one of the plurality of frictional engaging devices based on a predetermined control parameter when performing a prescribed first gearshift between the gears, the at least one of the plurality of frictional engaging devices being selectively engaged and disengaged and the engaging force of the at least one of the plurality of frictional engaging devices being controlled by the engaging-force control device in the first gearshift, and corrects the engaging force of at least one of the plurality of frictional engaging devices based on said learning correction by the controller of the engaging force of the at least one of the plurality of frictional engaging devices based on the predetermined control parameter when performing the prescribed first gearshift between the gears, when performing a second gearshift from a driving gear to a non-driving gear, the at least one of the plurality of frictional engaging devices being selectively engaged and disengaged in the second gearshift and the engaging force of the the at least one of the plurality of frictional engaging devices being controlled by the engaging-force control device in the second gearshift.

2. The control apparatus according to claim 1, wherein power of a driving power source is transmitted to the automatic transmission through a hydraulic transmission.

3. The control apparatus according to claim 2, wherein the first gearshift is a gearshift from a non-driving gear to a driving gear, and the control parameter is a change in input rotational speed in the gearshift from the non-driving gear to the driving gear.

4. The control apparatus according to claim 3, wherein the non-driving gear is a neutral gear which is attained by changing a position of a shift lever to a neutral position.

5. The control apparatus according to claim 3, wherein the driving gear is a forward gear for allowing a vehicle to run forward.

6. The control apparatus according to claim 2, wherein the first gearshift is a gearshift between a plurality of driving gears, and the control parameter is a change in input rotational speed in the gearshift between the plurality of driving gears.

7. The control apparatus according to claim 6, wherein a gearshift between the plurality of driving gears is a coast down shift in which a gear is automatically shifted from a driving gear having a smaller gear ratio to a driving gear having a larger gear ratio according to a reduction in vehicle speed during forward running while an accelerator pedal is not being depressed.

8. The control apparatus according to claim 6, wherein the non-driving gear is a neutral gear which is attained by changing a position of a shift lever to a neutral position.

9. The control apparatus according to claim 6, wherein the driving gear is a forward gear for allowing the vehicle to run forward.

10. The control apparatus according to claim 1, wherein the at least one of the plurality of frictional engaging devices in the first gearshift is substantially identical to the at least one of the plurality of frictional engaging devices in second first gearshift.

11. The control apparatus according to claim 1, wherein the at least one of the plurality of frictional engaging devices in the first and second gearshifts generate the engaging force based on a hydraulic pressure of a hydraulic fluid, and the controller further corrects the engaging force based on a temperature of the hydraulic fluid.

12. The control apparatus according to claim 2, wherein the at least one of the plurality of frictional engaging devices in the first and second gearshifts generate the engaging force based on a hydraulic pressure of a hydraulic fluid, the hydraulic pressure is generated by a mechanical oil pump which is rotated by the driving power source for running, the driving power source being connected to the hydraulic transmission, and the controller further corrects the engaging force based on a rotational speed of the driving power source.

13. A control method for a vehicular automatic transmission that attains a plurality of gears having different power transmission states by selectively engaging and disengaging at least one of a plurality of frictional engaging devices, and includes an engaging-force control device that controls, when selectively engaging and disengaging the at least one of the plurality of frictional engaging devices, engaging force of the selectively engaged and disengaged frictional engaging devices, the control method comprising:

performing learning correction of the engaging force of the at least one of the plurality of frictional engaging devices based on a predetermined control parameter when performing a prescribed first gearshift between the gears, the at least one of the plurality of frictional engaging devices being selectively engaged and disengaged in the first gearshift and the engaging force of the at least one of the plurality of frictional engaging devices being controlled by the engaging-force control device in the first gearshift; and correcting the engaging force of at least one of the plurality of frictional engaging devices based on the learning correction performed in the first gearshift when performing a second gearshift from a driving gear to a non-driving gear, the at least one of the plurality of frictional engaging devices being selectively engaged and disengaged in the second gearshift and the engaging force of the at least one of the plurality of frictional engaging devices being controlled by the engaging-force control device in the second gearshift.

14. A control apparatus for a vehicular automatic transmission that attains a plurality of gears having different power transmission states by selectively engaging and disengaging at least one of a plurality of frictional engaging devices, comprising:

engaging-force control means for controlling, when selectively engaging and disengaging the at least one of the plurality of frictional engaging devices, an engaging force of the selectively engaged and disengaged frictional engaging devices, and control means for performing learning correction of the engaging force of the at least one of the plurality of frictional engaging devices based on a predetermined control parameter when performing a prescribed first gearshift between the gears, the at least one of the plurality of frictional engaging devices being selectively engaged and disengaged and the engaging force of the at least one of the plurality of frictional engaging devices being controlled by the engaging-force control means in the first gearshift, and for correcting the engaging force of at least one of the plurality of frictional engaging devices based on said learning correction by the control means of the engaging force of the at least one of the frictional engaging devices based on the predetermined control parameter when performing the prescribed first gearshift between the gears, when performing a second gearshift from a driving gear to a non-driving gear, the at least one of the plurality of frictional engaging devices being selectively engaged and disengaged in the second gearshift and the engaging force of the at least one of the plurality of frictional engaging devices being controlled by the engaging-force control means in the second gearshift.

* * * * *